United States Patent
Havlovitz

(10) Patent No.: US 12,064,782 B2
(45) Date of Patent: Aug. 20, 2024

(54) HOSE-END SPREADER

(71) Applicant: OMS Investments, Inc., Los Angeles, CA (US)

(72) Inventor: Paul Havlovitz, Dublin, OH (US)

(73) Assignee: OMS Investments, Inc., Los Angeles, CA (US)

( * ) Notice: Subject to any disclaimer, the term of this patent is extended or adjusted under 35 U.S.C. 154(b) by 0 days.

(21) Appl. No.: 17/604,071

(22) PCT Filed: Apr. 16, 2020

(86) PCT No.: PCT/US2020/028403
§ 371 (c)(1),
(2) Date: Oct. 15, 2021

(87) PCT Pub. No.: WO2020/214749
PCT Pub. Date: Oct. 22, 2020

(65) Prior Publication Data
US 2022/0152637 A1 May 19, 2022

Related U.S. Application Data

(60) Provisional application No. 62/835,054, filed on Apr. 17, 2019.

(51) Int. Cl.
*B05B 7/14* (2006.01)
*B05B 15/25* (2018.01)

(52) U.S. Cl.
CPC .......... *B05B 7/1422* (2013.01); *B05B 7/1495* (2013.01); *B05B 15/25* (2018.02)

(58) Field of Classification Search
CPC ... B05B 7/1413; B05B 7/1418; B05B 7/1422; B05B 7/1486; B05B 7/149;
(Continued)

(56) References Cited

U.S. PATENT DOCUMENTS

| 425,338 | A | * | 4/1890 | Muller | B65G 53/46 |
| | | | | | 239/689 |
| 2,187,376 | A | * | 1/1940 | Gulbert | B05B 7/1422 |
| | | | | | 406/134 |

(Continued)

FOREIGN PATENT DOCUMENTS

| CN | 2781741 Y | 5/2006 |
| CN | 201064099 Y | 5/2008 |

(Continued)

OTHER PUBLICATIONS

"Wolf Garten Power Spreader WE-B," spec page (Jan. 2014).
(Continued)

*Primary Examiner* — Cody J Lieuwen
(74) *Attorney, Agent, or Firm* — Frost Brown Todd LLP

(57) ABSTRACT

A hose-end spreader device includes a hopper configured to contain an amount of granular product, the hopper comprising a hopper inlet and a hopper outlet in communication with the hopper inlet. The device further includes a first chamber in communication with the hopper outlet, the first chamber comprising a first opening through which the granular product exits the device, and a first impeller disposed in the first chamber. Also included are a housing disposed below the first chamber, the housing comprising a fluid inlet, a second chamber in communication with the fluid inlet, and a second opening in communication with the second chamber through which a fluid exits the device, and a second impeller disposed in the second chamber. The second impeller is coupled to the first impeller.

21 Claims, 10 Drawing Sheets

(58) Field of Classification Search
CPC ....... B05B 7/1495; B05B 3/0427; B05B 3/06;
B05B 15/25; A01C 7/02; A01C 15/02;
A01M 9/0038; A01M 9/0046
USPC ....... 239/654, 655, 662, 668–669, 681, 683,
239/684, 687–689, 381
See application file for complete search history.

(56) References Cited

U.S. PATENT DOCUMENTS

| | | | |
|---|---|---|---|
| 2,740,230 A * | 4/1956 | Clapper | B05B 7/1422 |
| | | | 239/653 |
| 2,892,286 A * | 6/1959 | Martin | A01M 9/0061 |
| | | | 222/323 |
| 3,157,402 A | 11/1964 | Love, Jr. | |
| 3,227,461 A | 1/1966 | Love, Jr. | |
| D232,802 S | 9/1974 | Steinkamp et al. | |
| 3,993,225 A | 11/1976 | Manni | |
| 4,062,496 A | 12/1977 | Melton | |
| 4,071,170 A | 1/1978 | Gunzel, Jr. et al. | |
| 4,089,441 A | 5/1978 | Cole et al. | |
| 4,140,280 A | 2/1979 | Allen et al. | |
| 4,167,248 A * | 9/1979 | Akazawa | B05B 7/145 |
| | | | 222/242 |
| 4,387,852 A | 6/1983 | Mattson et al. | |
| 4,473,184 A | 9/1984 | Martin | |
| 4,492,341 A | 1/1985 | Allen | |
| 4,678,377 A | 7/1987 | Bouchard | |
| D296,789 S | 7/1988 | Larsson | |
| 5,054,693 A | 10/1991 | Chow | |
| 5,119,993 A | 6/1992 | Gunzel, Jr. et al. | |
| 5,123,598 A | 6/1992 | Courtney et al. | |
| D327,823 S | 7/1992 | Demarest | |
| D333,951 S | 3/1993 | Courtney et al. | |
| 5,271,568 A | 12/1993 | Stevie | |
| 5,285,971 A | 2/1994 | Havlovitz | |
| 5,333,795 A | 8/1994 | Jessen | |
| 5,409,166 A * | 4/1995 | Gunzel, Jr. | B05B 7/1422 |
| | | | 239/654 |
| 5,429,278 A | 7/1995 | Sansalone | |
| D387,638 S | 12/1997 | Delaby et al. | |
| D388,440 S | 12/1997 | Bentley | |
| 6,024,294 A | 2/2000 | Dillon | |
| 6,089,477 A | 7/2000 | Dillon | |
| 6,092,746 A | 7/2000 | Dillon | |
| 6,425,500 B2 | 7/2002 | Mcnally | |
| 6,616,074 B2 | 9/2003 | Courtney et al. | |
| 6,729,557 B2 | 5/2004 | Dillon | |
| 6,840,468 B2 | 1/2005 | Barnett | |
| D534,044 S | 12/2006 | Zak | |
| 7,281,675 B2 | 10/2007 | Elrod et al. | |
| 7,328,861 B2 | 2/2008 | Sagol et al. | |
| 8,104,648 B2 | 1/2012 | Restive et al. | |
| 8,272,584 B2 | 9/2012 | Barnett et al. | |
| D744,303 S | 12/2015 | Marconi | |
| D796,922 S | 9/2017 | Hsu et al. | |
| D823,655 S | 7/2018 | Dubiel et al. | |
| D834,901 S | 12/2018 | Dubiel | |
| D855,421 S | 8/2019 | Hsu et al. | |
| 10,595,458 B2 | 3/2020 | Hsu et al. | |
| D893,270 S | 8/2020 | Hsu et al. | |
| 2006/0016918 A1 | 1/2006 | Sagol et al. | |
| 2006/0157518 A1 | 7/2006 | Havlovitz et al. | |
| 2007/0194155 A1 | 8/2007 | Kendall | |
| 2009/0101670 A1 * | 4/2009 | Restive | B01F 25/85 |
| | | | 222/413 |
| 2009/0277979 A1 | 11/2009 | Cichy et al. | |
| 2013/0001332 A1 | 1/2013 | Marconi, Jr. | |
| 2013/0075502 A1 * | 3/2013 | Barnett | E01C 19/2005 |
| | | | 239/683 |
| 2013/0092748 A1 | 4/2013 | Waggoner et al. | |
| 2014/0166785 A1 | 6/2014 | Barnett et al. | |
| 2014/0263484 A1 | 9/2014 | Marconi | |
| 2017/0049042 A1 | 2/2017 | Hsu et al. | |
| 2017/0202133 A1 | 7/2017 | Rosenbaum et al. | |

FOREIGN PATENT DOCUMENTS

| | | |
|---|---|---|
| CN | 201207808 Y | 3/2009 |
| CN | 202354058 U | 8/2012 |
| WO | 2011057205 A2 | 5/2011 |

OTHER PUBLICATIONS

"Black & Decker Motorised Law Seed/Fertiliser Spreader: Amazon. co.uk: DIY Tools," http://www.amazon.co.uk/Black-Decker-Motorised-Fertiliser-Spreade- r/dp/B000NY1E8K, front page [Internet accessed on Feb. 25, 2015].

"New Ready 2Go Spreader," http://www.ready2gospreader.com/ 4 pages [Internet accessed on Feb. 25, 2015].

Detail View of "Wolf Garten WE-B Power Spreader," http://www.wolf-garten.org/products/seeds-and-fertiliser/spreaders-and-ho- se-reel-trolleysdetails, 5 pages [Internet accessed on Nov. 23, 2015].

International Written Opinion and Search Report of the International Searching Authority for International Patent App. No. PCT/US20/28403 dated as mailed on Jun. 19, 2020; 10 pages.

\* cited by examiner

HOSE-END SPREADER

CROSS-REFERENCE TO RELATED PATENT APPLICATIONS

This application is a national stage application under 35 U.S.C. § 371 of International Application No. PCT/US2020/028403, filed Apr. 16, 2020, which claims the benefit of U.S. Provisional Patent Application No. 62/835,054, filed on Apr. 17, 2019, the disclosures of which are hereby incorporated herein by reference in their entireties.

TECHNICAL FIELD

The present disclosure relates generally to spreader devices, such as hose-end spreader devices. The spreader devices are used in the consumer, professional, or industrial markets.

BACKGROUND

Devices, such as broadcast spreaders and hand-held spreaders, are used to apply granular products, such as grass seed, fertilizer, and insecticide, for lawn care purposes. Some spreaders mix water with the granular product during operation, which often results in clogging of the spreader. There is a continued need for an improved spreader.

SUMMARY

According to one embodiment, a hose-end spreader device includes a hopper configured to contain an amount of granular product, the hopper comprising a hopper inlet and a hopper outlet in communication with the hopper inlet. The device further includes a first chamber in communication with the hopper outlet, the first chamber comprising a first opening through which the granular product exits the device, and a first impeller disposed in the first chamber. Also included are a housing disposed below the first chamber, the housing comprising a fluid inlet, a second chamber in communication with the fluid inlet, and a second opening in communication with the second chamber through which a fluid exits the device, and a second impeller disposed in the second chamber. The second impeller is coupled to the first impeller.

According to one embodiment, a hose-end spreader device includes a hopper configured to contain an amount of product, the hopper comprising a hopper inlet and a hopper outlet in communication with the hopper inlet. The device further includes a first chamber in communication with the hopper outlet, the first chamber comprising a first opening through which the product exits the device and a first impeller disposed in the first chamber. Also included is a second chamber disposed below the first chamber, the second chamber comprising a second opening through which a fluid exits the device and a second impeller disposed in the second chamber, the second impeller being coupled to the first impeller. The first and second chambers are constructed to keep the product separated from the fluid while inside the device.

According to one embodiment, a hose-end spreader device includes a hopper configured to contain an amount of product, the hopper comprising a hopper inlet and a hopper outlet in communication with the hopper inlet. The device also includes a first chamber in communication with the hopper outlet, the first chamber comprising a first opening through which the product exits the device and a first impeller disposed in the first chamber. Also included is a second chamber disposed below the first chamber, the second chamber comprising a second opening through which a fluid exits the device, and a second impeller disposed in the second chamber, the second impeller being coupled to the first impeller. A fluid inlet is in communication with the second chamber. The device is constructed such that a fluid flows through the fluid inlet into the second chamber, through the second chamber causing rotation of the first and second impellers, and out the second opening, exiting the device. Further, rotation of the first impeller causes the product to dispense from the first opening, exiting the device separate from the fluid.

DETAILED DESCRIPTION

Figure 1:
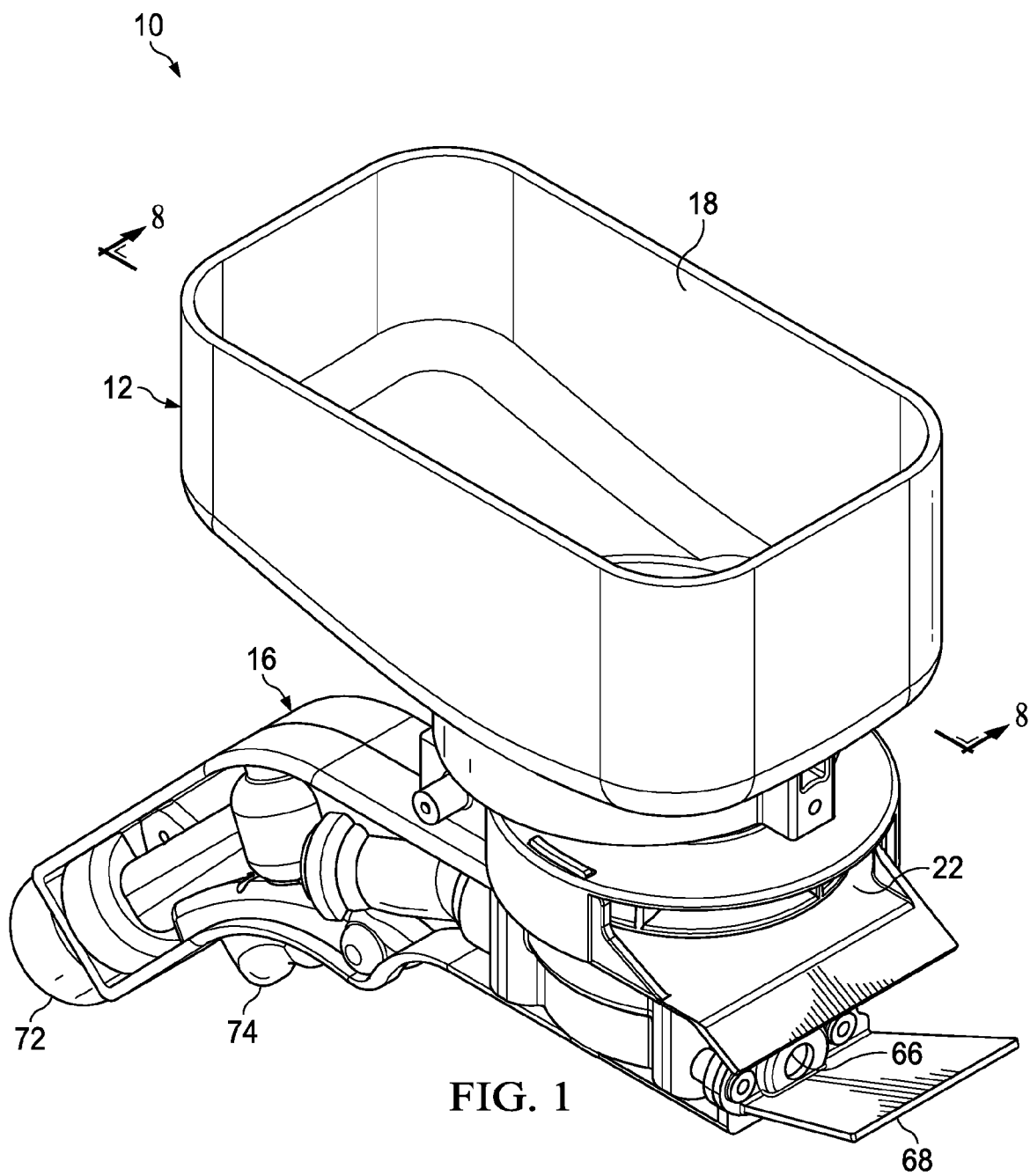
FIG. 1 depicts a perspective view of a hose-end spreader device according to exemplary embodiments.
Figure 2:
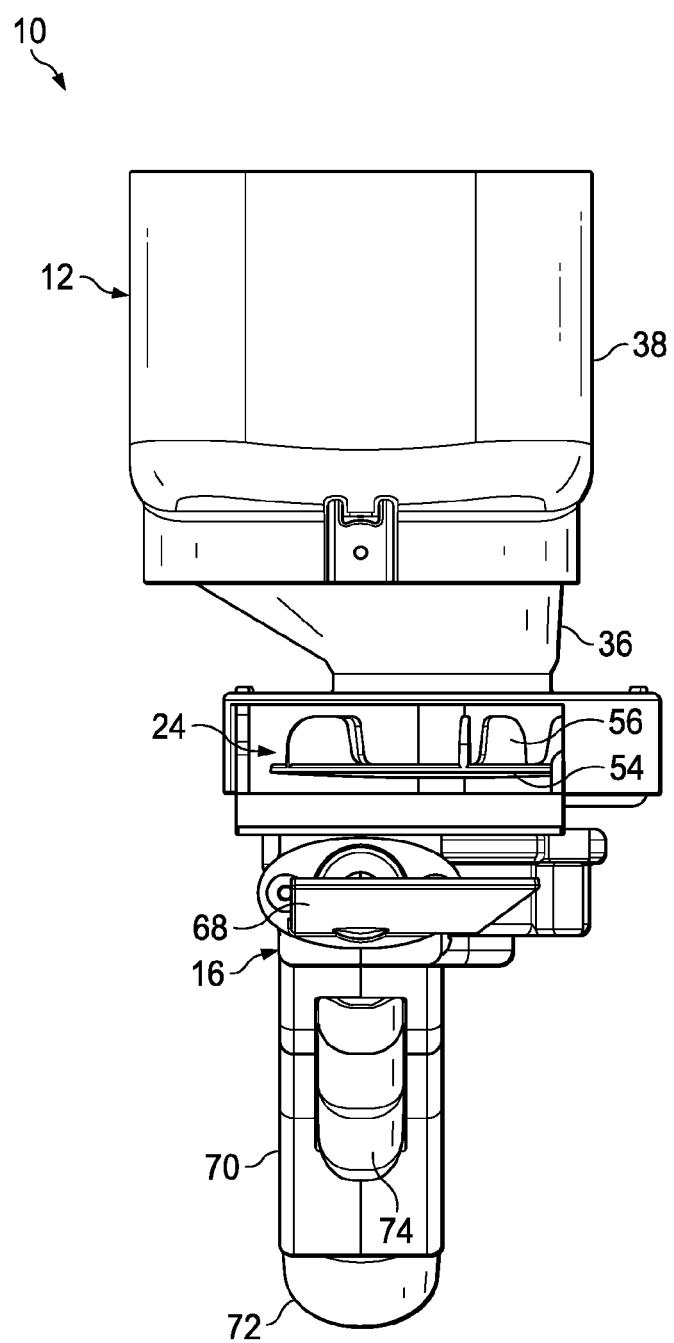
FIG. 2 depicts a front view of the hose-end spreader device of FIG. 1 according to exemplary embodiments.
Figure 3:
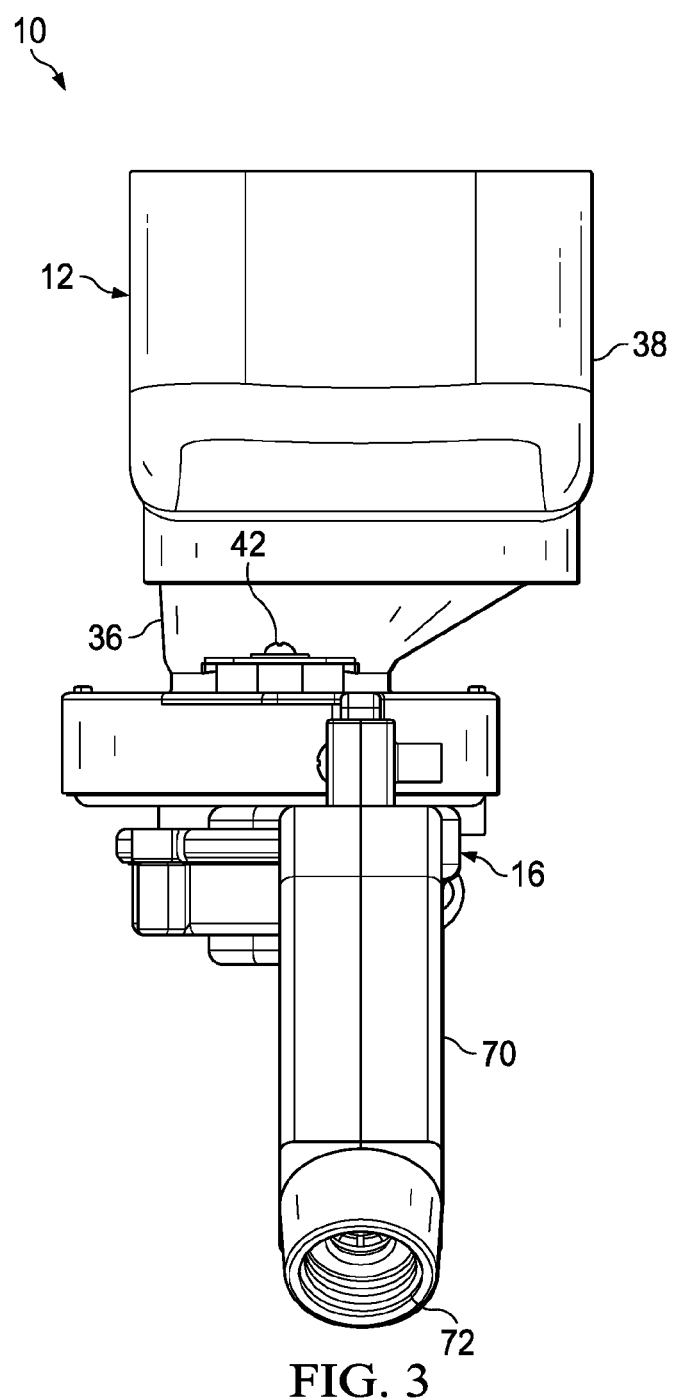
FIG. 3 depicts a rear view of the hose-end spreader device of FIG. 1 according to exemplary embodiments.
Figure 4:
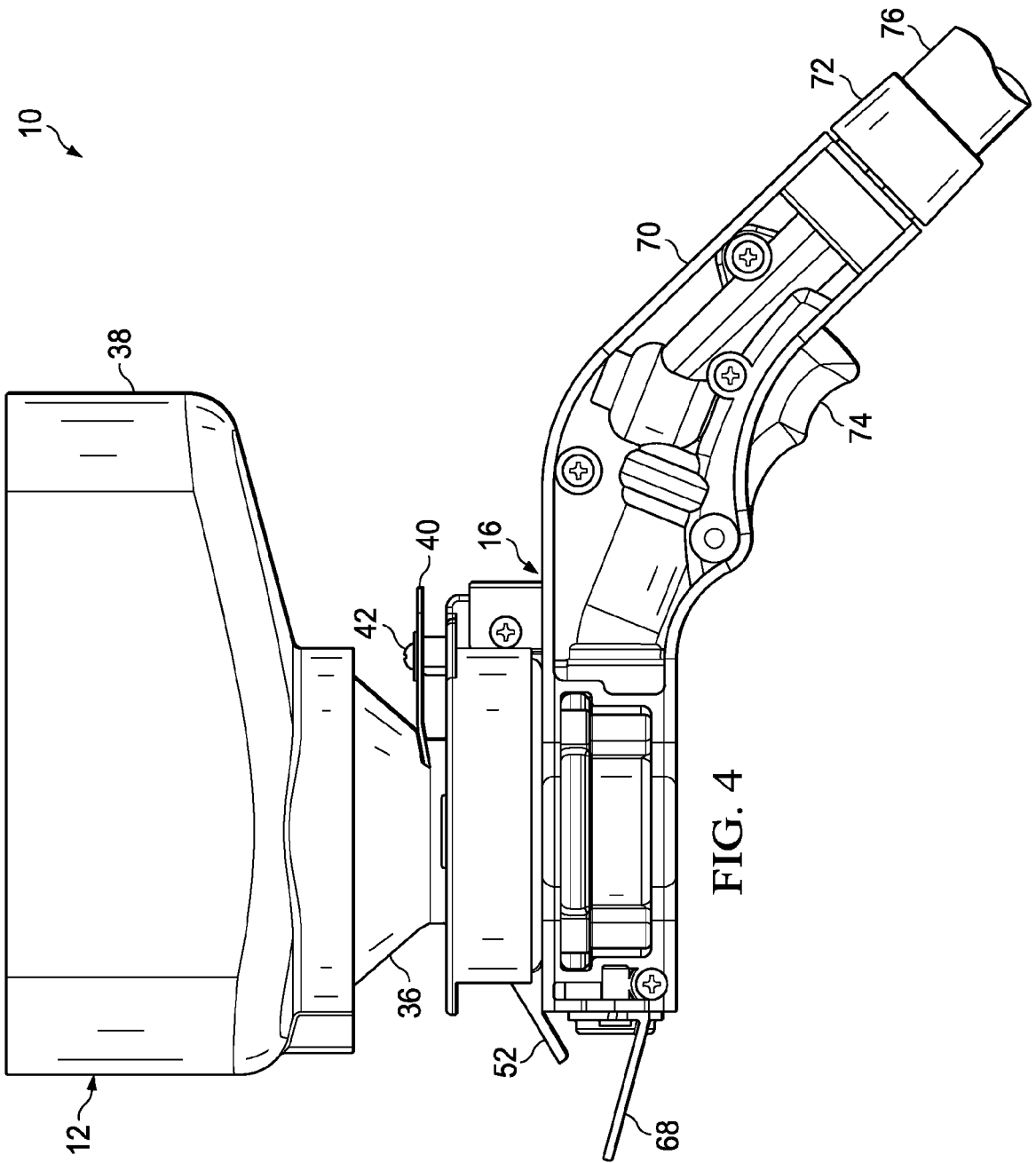
FIG. 4 depicts a left side view of the hose-end spreader device of FIG. 1 according to exemplary embodiments.
Figure 5:
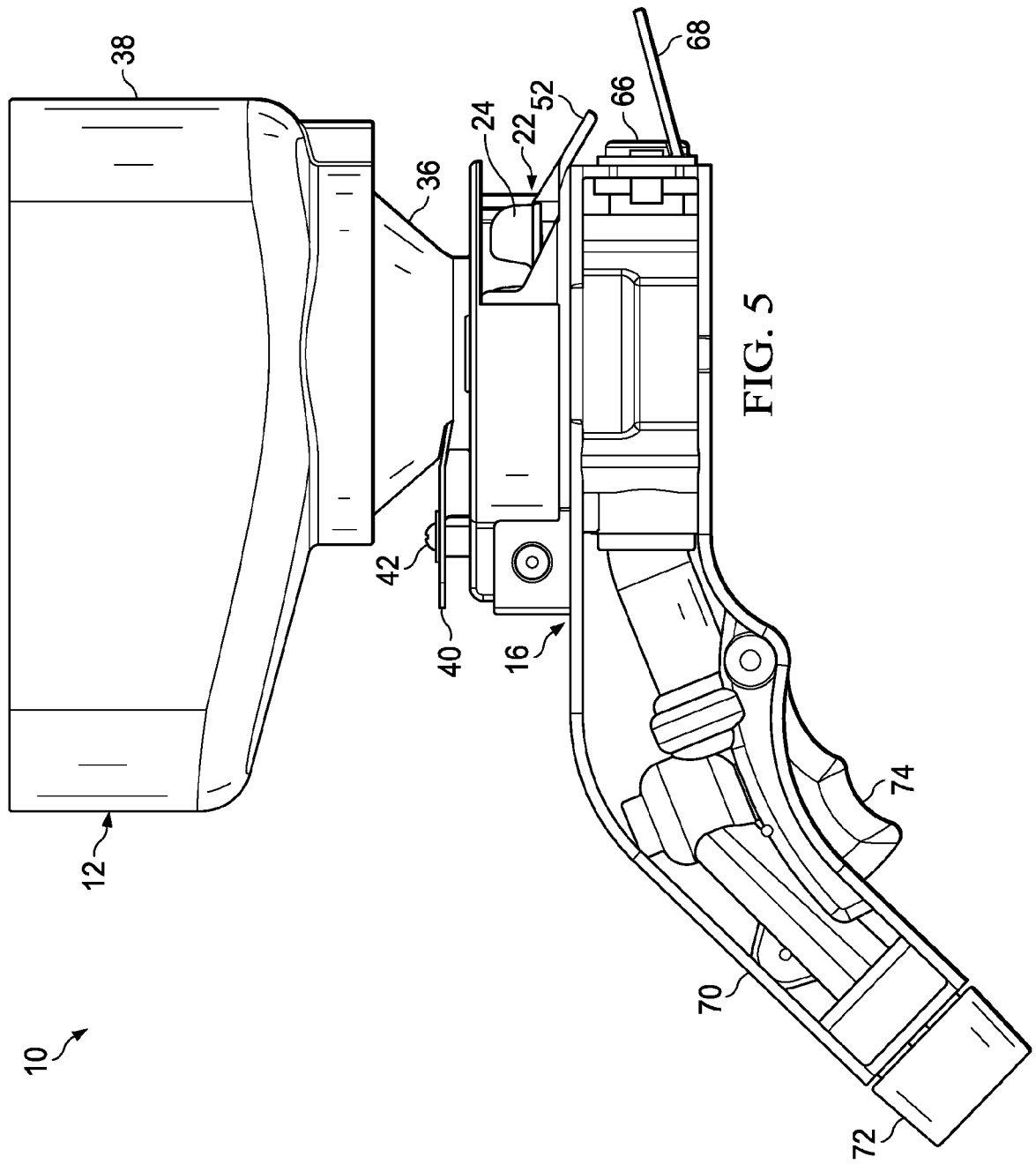
FIG. 5 depicts a right side view of the hose-end spreader device of FIG. 1 according to exemplary embodiments.

Hose-end spreader devices for spreading a granular product are described herein. The hose-end spreader devices may be configured for broadcasting granular product and water onto a lawn, terrain, or other surface. The present devices may be attached to a hose, such as a garden hose, and movement of the fluid through the device causes the granular product to spread and/or dispense from the device. The granular product and water mix after leaving the device. The present devices may broadly be applicable to spreading any granular product, but may be particularly suitable for seeds and fertilizer.

The term "granular product" as used herein refers to product that is particulate (or granular) in nature in that it is a dry (not liquid) product that is flowable. For example, granular product may include without limitation, seed, ice melting granules, fertilizer, pesticides, granular soil amendment material, granular oil absorbent material, dusting products, granular floor cleaning product, or any other product, as well as combinations thereof, that is dry and flowable.

Referring to FIGS. 1-9, a hose-end spreader device 10 includes a hopper 12, a first chamber 14, and a housing 16. The hopper 12 is configured to contain an amount of granular product and comprises a hopper inlet 18 and a hopper outlet 20 in communication with the hopper inlet 18. The first chamber 14 is disposed below and is in communication with the hopper outlet 20. The first chamber 14 comprises a first opening 22 through which the granular product exits the device, and a first impeller 24 is disposed in the first chamber 14. Disposed below the first chamber 14 is a housing 26, which comprises a fluid inlet 28, a second chamber 30 in communication with the fluid inlet 28, and a fluid outlet 32 in communication with the second chamber 30 through which a fluid exits the device 10. A second impeller 34 is disposed in the second chamber 30. The first impeller 24 and the second impeller 34 are coupled.

Figure 6:
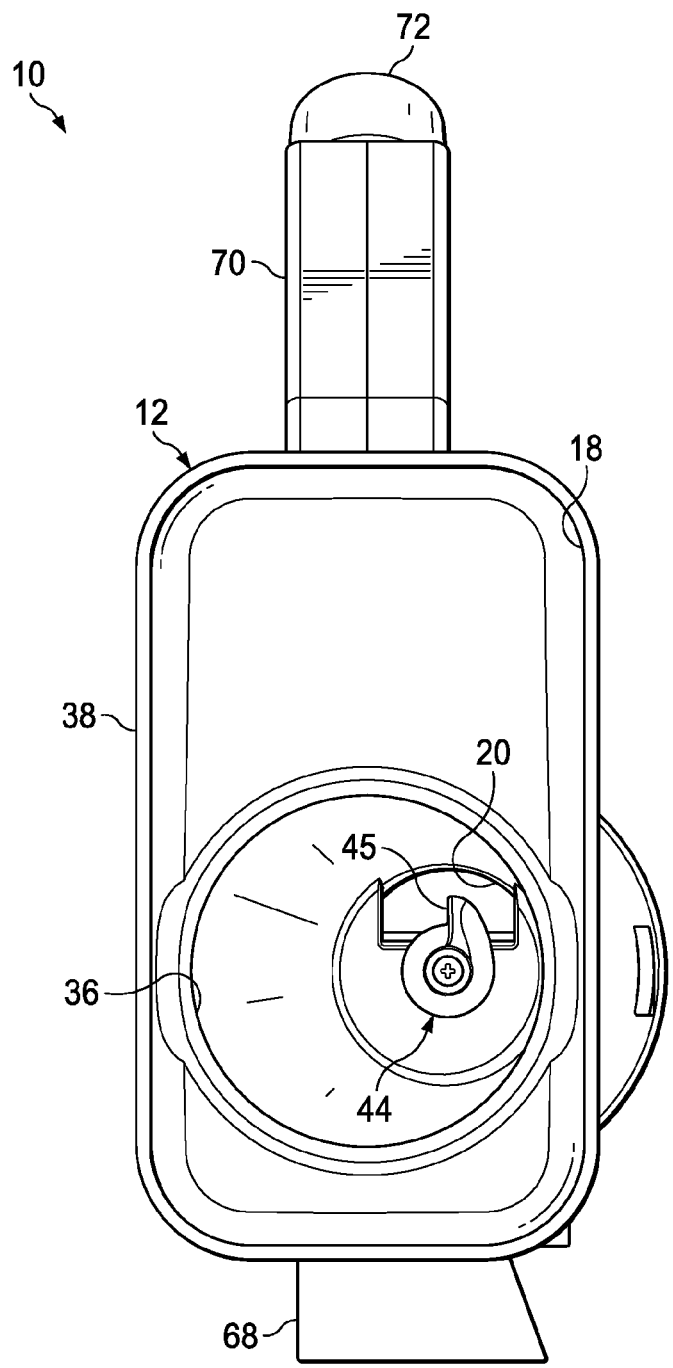
FIG. 6 depicts a top view of the hose-end spreader device of FIG. 1 according to exemplary embodiments.
Figure 7:
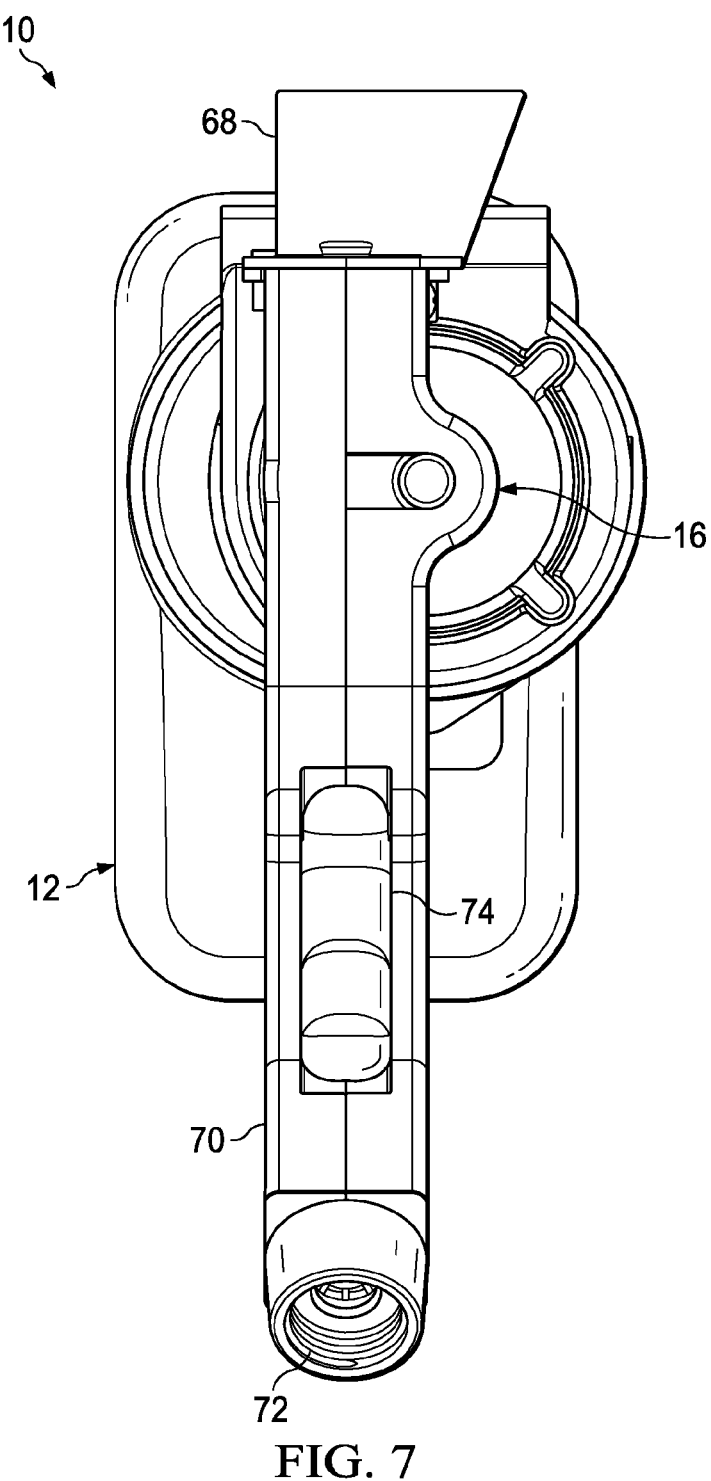
FIG. 7 depicts a bottom view of the hose-end spreader device of FIG. 1 according to exemplary embodiments.
Figure 8A:
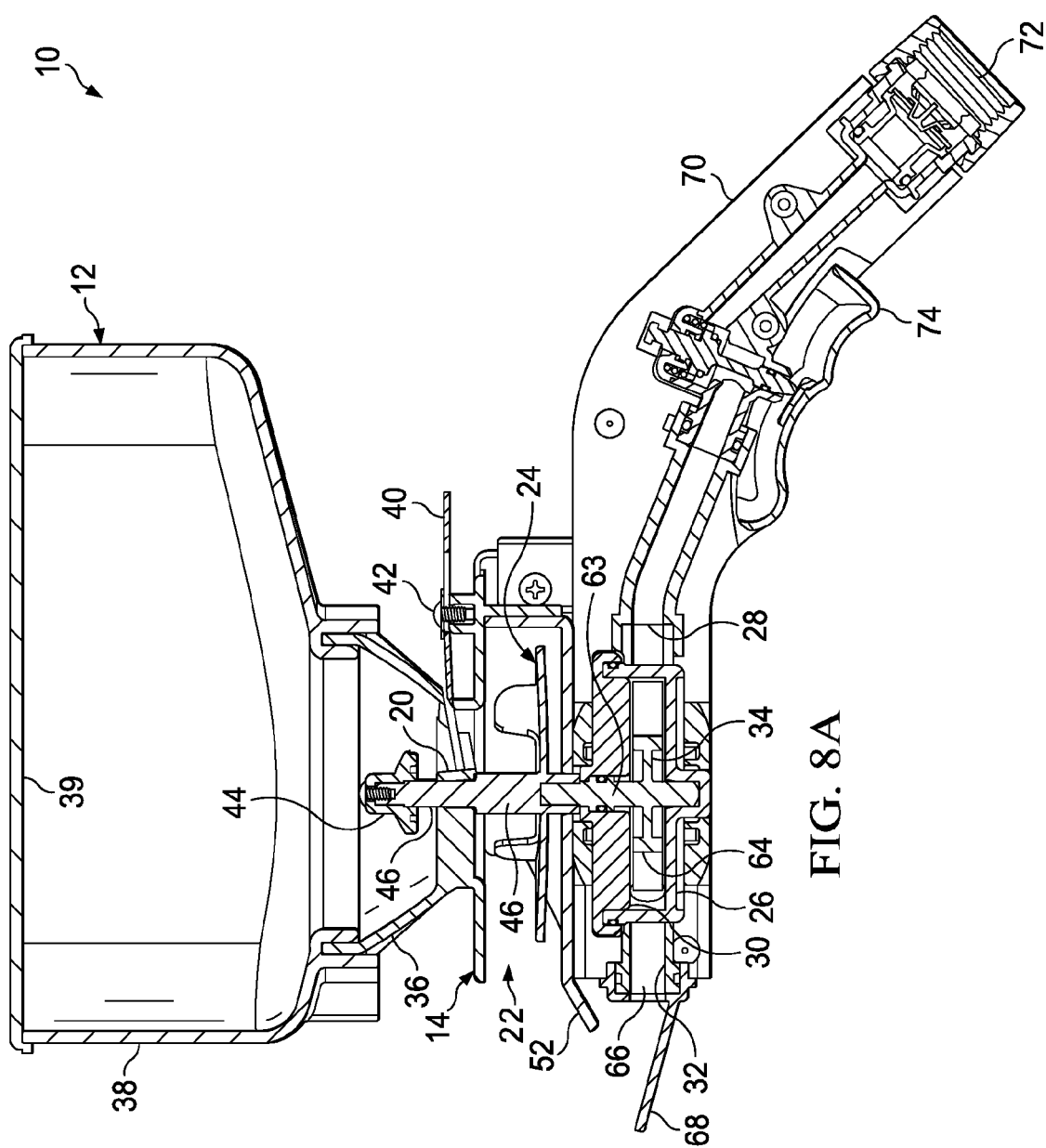
FIG. 8A depicts a cross sectional view taken along line 8-8 of FIG. 1 with the shutter plate in an opened position according to exemplary embodiments.
Figure 8B:
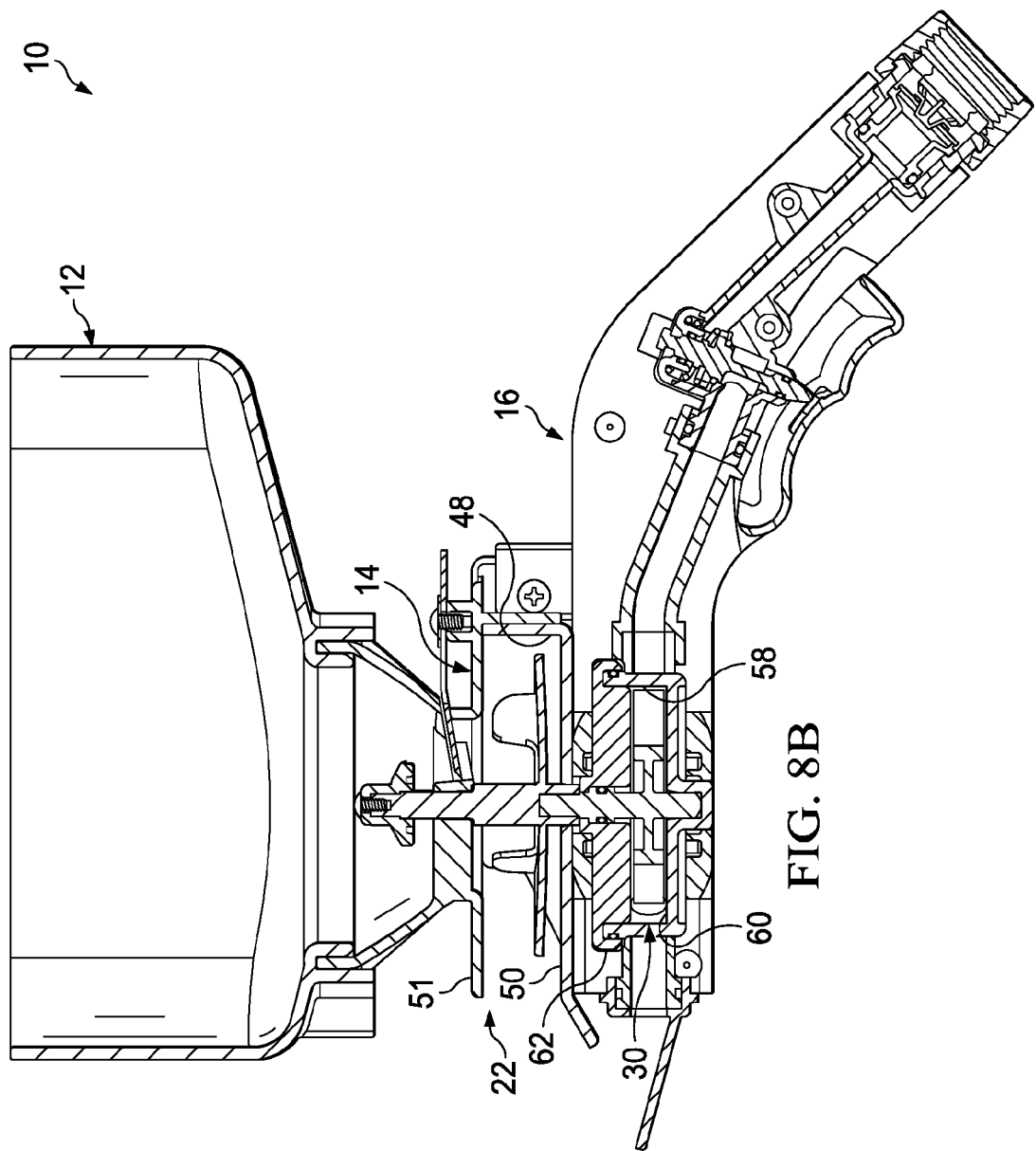
FIG. 8B depicts a cross sectional view taken along line 8-8 of FIG. 1 with the shutter plate in a closed position according to exemplary embodiments.

In one or more embodiments, the hopper 12 may be a unitary, monolithic structure or include multiple components making up the hopper 12 that are fixedly or removably connectable to each other. As shown in FIGS. 6 and 8A, in an embodiment, the hopper 12 comprises a funnel 36, a container 38, and a lid 39 positioned on the container 38. The lid 39 may be removed from the container 38 to fill or empty the hopper 12. The funnel 36 and container 38 are in communication with each other. The bottom surface of the container 38 may be sloped to allow easier movement of the granular product towards the funnel 36. During use of the device 10, granular product will move from the container 38 through the funnel 36 and into the first chamber 14.

In one or more embodiments, the device 10 further includes an adjustable shutter plate 40 that is used to set an opening size of the hopper outlet 20 located at the bottom portion of the hopper 12. In the closed position, the hopper outlet 20 is closed; in the open position, at least a portion of the hopper outlet 20 is exposed. The shutter plate 40 includes a slide channel 41. A stop 42 is positioned in the slide channel. In an embodiment, the stop 42 may also be used to couple the shutter plate 40 to the device 10. For example, the stop 42 may be a screw or other connector. The shutter plate 40 is movable between a first, open position (FIG. 8A) where the stop 42 abuts a first end of the slide channel 41 and a second, closed position (FIG. 8B) where the stop 42 abuts the opposite end of the slide channel 41.

Additionally, in one or more embodiments, the device 10 includes an agitator 44 disposed in the hopper 12. The agitator 44 is coupled to a rotatable shaft 46 discussed further below. In the embodiment shown, the agitator 44 has a single arm or blade. The agitator 44 may have a curved blade 45 that is optimized for use in various granular material types used with the device 10. In various embodiments, the agitator 44 may have two or more arms or blades. Other agitator configurations are possible and may be optimized for use with various granular material types. In various embodiments, the agitator 44 may be changeable to allow for use of different agitator types and configurations based on the type of granular material.

Figure 9:
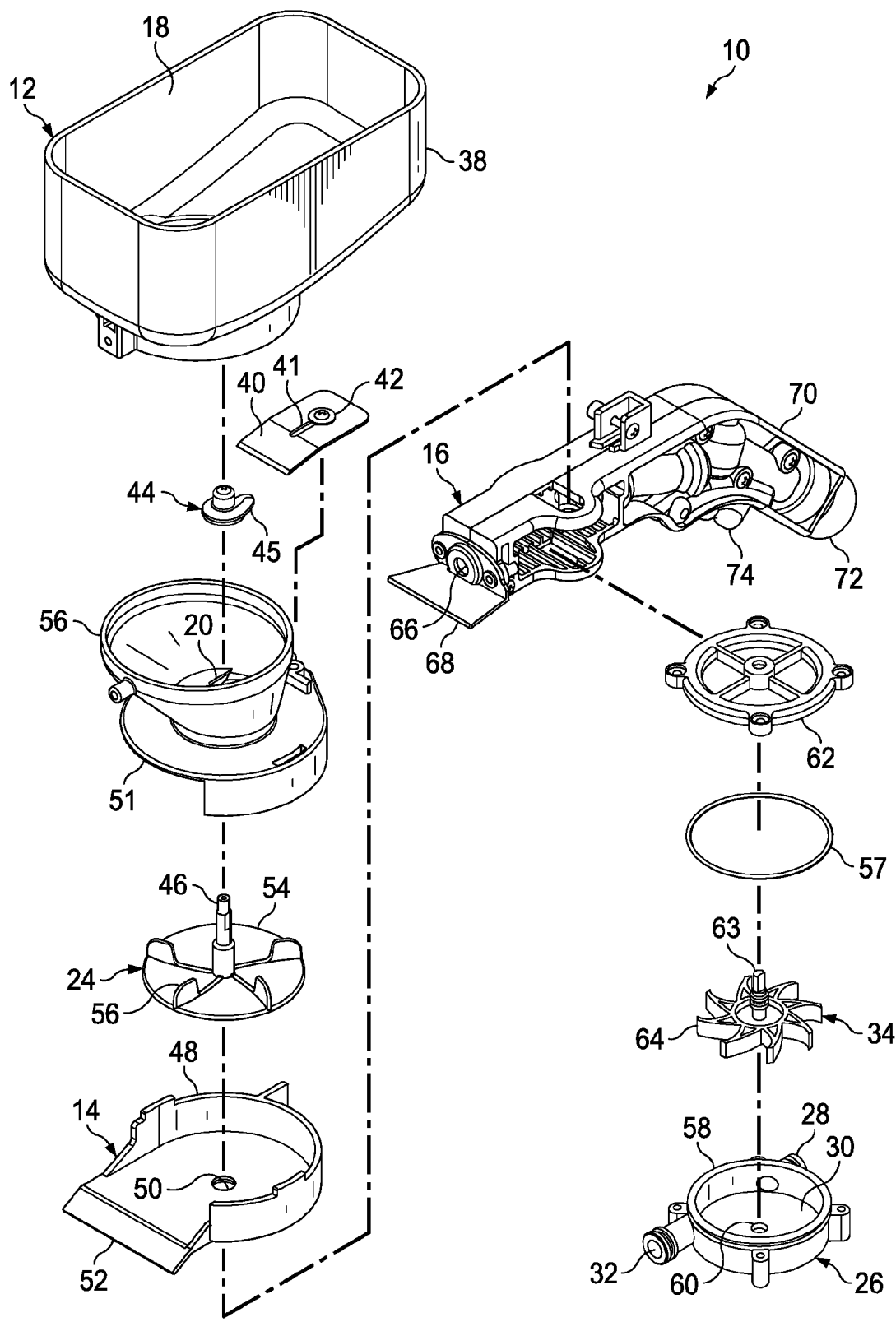
FIG. 9 depicts an exploded view of the hose-end spreader device of FIG. 1 according to exemplary embodiments.

Referring to FIGS. 8A-9, the first chamber 14 includes a sidewall 48 extending from a bottom surface 50. The sidewall 48 may act as a deflector, which prevents granular product from being thrown, during dispensing, towards the rear of the device 10 (i.e., towards the user) or onto sidewalks, driveways, or other areas where the product is not desired. The first opening 22 is at least partially defined by the ends of the sidewall 48 and the bottom surface 50. A portion of the funnel 36 may act as an upper surface or cover for a part of the first chamber 14. For example, a lip 51 of the funnel 36 may partially define the first opening 22 and prevent the granular produce from being thrown, during dispensing, up towards the hopper 12. The first chamber 14 also includes a ledge 52 extending from the bottom surface 50. The ledge 52 helps prevent granular product exiting the first opening 22 from falling onto portions of the device 10 below the ledge 52, such as the fluid outlet 32. In the interior of the first chamber 14 is the first impeller 24, which is positioned below the hopper outlet 20. The first impeller 24 includes the rotatable shaft 46 and, thus, is coupled to the agitator 44. The first impeller 24 includes an impeller plate 54 and a plurality of blades 56. The first impeller 24 as shown includes five blades 56, although the number and shape of the blades may vary.

The second chamber 30 in the housing 26 is sealed to prevent fluid from entering or exiting except through the fluid inlet 28 and the fluid outlet 32. The device 10 may include one or more sealing components, such as an O-ring 57. In one or more embodiments, the second chamber 30 may be a unitary, monolithic structure or include multiple components making up the second chamber 30 that are fixedly or removably connectable to each other. In the illustrated embodiment, the second chamber 30 includes a sidewall 58 extending from a bottom surface 60. The second chamber 30 further includes a cover 62, which forms a seal with the sidewall 58. In the interior of the second chamber 30 is the second impeller 34, which is axially aligned with the first impeller 24 and the agitator 44. The second impeller 34 comprises a shaft 63, which is coupled to the rotatable shaft 46. Accordingly, the second impeller 34 is coupled to the first impeller 24 and indirectly coupled to the agitator 44. In one or more embodiments, the rotatable shaft 46 and the shaft 63 are multiple components that are fixedly or removably connectable to each other or may be a unitary, monolithic structure. Further, in one or more embodiments, the first impeller 24, the second impeller 34, and the agitator 44 may be directly or indirectly coupled to each other or may be a unitary, monolithic structure. The second impeller 34 includes a plurality of blades 64. The second impeller 34 as shown includes eleven blades 64, although the number and shape of the blades may vary. In the illustrated embodiment, the first impeller 24 and the second impeller 34 are axially aligned.

With further reference to FIGS. 8A-9, the housing 26 further includes a second opening 66 in communication with the fluid outlet 32. Fluid that enters the second chamber 30 exits the device 10 through the fluid outlet 32 and the second opening 66. A deflector 68 extends from the housing 26. As water exits the second opening 66, the deflector 68 may cause or assist in causing the fluid to fan outwards. In other words, the width of the fluid stream increases as the fluid moves further away from the second opening 66.

Still referring to FIGS. 8A-9, the housing 26 further includes a handle 70, a hose connection 72, and a trigger 74. The handle 70 may have one or more rubber portions and a grip portion that assists with maintaining a secure grip on the handle 70. Other suitable materials may be used. The hose connection 72 is disposed at a rear portion of the housing 26 and is configured to removably couple the housing 26 to a liquid source, such as a hose 76. The hose connection 72 is in communication with the fluid inlet 28. The trigger 74 is located on a lower portion of the handle 70 but can be positioned in a variety of other locations as well. In various embodiments, a trigger lock may be included. In FIG. 8A, the trigger 74 is depicted in a depressed state. The depressed state depicted is an operational state in which the device 10 is "on." When the trigger 74 is in an "on" position, fluid may flow from the hose connection 72 to the fluid inlet 28. The trigger 74, when moving from an "off" to an "on" position moves inwardly toward the housing 26. The operation of the device 10 is described in further detail below.

In exemplary embodiments, the spreader device 10 is constructed of hard, durable plastic. Other suitable materials and combinations of materials may be used.

In exemplary embodiments, a method of spreading granular product is described below. The described method is exemplary as there are a variety of ways to carry out the present disclosure. First, the hopper is filled or partially filled with granular product. Next, the shutter plate is adjusted to provide the desired size of the hopper outlet. A hose or other liquid source is attached to the hose connection. Next, the trigger can then be depressed to begin operation of the device when the user is ready and spreader operation commences. Depression of the trigger allows water to flow from the hose (or other liquid source) through the fluid inlet into the second chamber. The water flowing through the second chamber causes the second impeller to rotate. Rotation of the second impeller causes rotation of the first impeller and the agitator due to the connection therebetween. The water exits the second chamber through the second opening and exits the device through the second opening. As the water exits the second opening, the deflector fans out the water. Granular product flows from the hopper, agitated by the rotating agitator, through the hopper opening at a rate permitted by the shutter plate. Then, the granular product impacts the rotating first impeller, which causes the granular product to be ejected from the device through the first opening and spread over the desired terrain. Upon completion of the desired spreading, the trigger is released and operation of the device ceases.

In one embodiment, the granular product and the water mix together at a distance from the device. For example, the granular product and the water begin mixing when the two streams are four or more feet from the device. In one or more embodiments, the granular product and the water begin mixing when the two streams are between four and eight feet from the device.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A hose-end spreader device, the device comprising:
   a hopper configured to contain an amount of granular product, the hopper comprising a hopper inlet and a hopper outlet in communication with the hopper inlet;
   a first chamber in communication with the hopper outlet, the first chamber comprising a first opening through which the granular product exits the device;
   a first impeller disposed in the first chamber; the first impeller comprising a plate and a plurality of blades;
   a housing disposed below the first chamber, the housing comprising a fluid inlet, a second chamber in communication with the fluid inlet, and a second opening in communication with the second chamber through which a fluid exits the device; and
   a second impeller disposed in the second chamber and being disposed below the first chamber and the first impeller and coupled to the first impeller;
   wherein the granular product and the fluid exit the device, separately from each other, at the first opening and the second opening, respectively.

2. The device of claim 1, further comprising a shaft extending through the first chamber and the second chamber, the shaft being coupled to the first impeller and the second impeller.

3. The device of claim 2, wherein the first chamber and the second chamber are constructed to keep the granular product separated from the fluid while inside the device.

4. The device of claim 3, wherein, when the fluid moves through the second chamber and exits the second opening, movement of the fluid causes rotation of the first impeller and the second impeller, and rotation of the first impeller causes the granular product to exit the first opening.

5. The device of claim 4, wherein an axis of rotation of the second impeller is perpendicular to a flow of the fluid through the second chamber.

6. The device of claim 4, further comprising an agitator disposed in a bottom portion of the hopper, the agitator being coupled to the first impeller and the second impeller.

7. The device of claim 4, further comprising a handle and a trigger movably coupled to the handle, the trigger being movable between a first position where fluid is prevented from entering the fluid inlet and a second position where fluid is allowed to enter the fluid inlet.

8. The device of claim 7, further comprising a shutter plate movably coupled to the hopper, the shutter plate being movable between a first shutter plate position where the shutter plate covers the hopper outlet and a second shutter plate position where the shutter plate is retracted and uncovers the hopper outlet,
   wherein moving the trigger from the first position to the second position causes the shutter plate to move from the first shutter plate position to the second shutter plate position.

9. The device of claim 8, wherein the handle is configured to be removably coupled to a hose.

10. The device of claim 1, wherein the granular product and fluid mix at a distance at least two feet from the second opening.

11. The device of claim 1, wherein a diameter of the first impeller is greater than a diameter of the second impeller.

12. The device of claim 1, wherein the second opening is positioned forward of the first opening relative to a handle.

13. The device of claim 1, wherein a portion of the hopper is positioned forward of the first opening relative to the second chamber.

14. The device of claim 1, further comprising a deflector extending from the second opening configured to cause the fluid exiting the second opening to spread.

15. The device of claim 1, further comprising a ledge extending from the first opening over the second opening configured to prevent the granular product from falling directly into the second opening.

16. The device of claim 1, further comprising a shutter plate movably coupled to the hopper, the shutter plate being movable between a first position where the shutter plate covers the hopper outlet and a second position where the shutter plate is retracted and uncovers the hopper outlet.

17. The device of claim 1, further comprising a lid removably coupled to the hopper.

18. A hose-end spreader device, the device comprising:
   a hopper configured to contain an amount of product, the hopper comprising a hopper inlet, a funnel, and a hopper outlet, the hopper outlet positioned at a bottom portion of the funnel and in communication with the hopper inlet;

a first chamber in communication with the hopper outlet, the first chamber comprising a first opening through which the product exits the device;
a first impeller disposed in the first chamber;
a second chamber disposed below the first chamber, the second chamber comprising a second opening through which a fluid exits the device;
a second impeller disposed in the second chamber, the second impeller being coupled to the first impeller; and
wherein the first chamber and the second chamber are constructed to keep the product separated from the fluid while inside the device;
wherein an axis of rotation of the first impeller is coincident with an axis of rotation of the second impeller;
wherein, when the fluid moves through the second chamber and exits the second opening, movement of the fluid causes rotation of the first impeller and the second impeller, and rotation of the first impeller causes the granular product to exit the first opening; and
wherein the axis of rotation of the second impeller is perpendicular to a flow of the fluid through the second chamber.

19. The spreader device of claim 18, further comprising a fluid inlet in communication with the second chamber.

20. The spreader device of claim 18, wherein the device is portable.

21. A hose-end spreader device, the device comprising:
a hopper configured to contain an amount of product, the hopper comprising a hopper inlet and a hopper outlet in communication with the hopper inlet;
a first chamber in communication with the hopper outlet, the first chamber comprising a first opening through which the product exits the device;
a first impeller disposed in the first chamber, wherein the first impeller comprises a plate and a plurality of blades;
a second chamber disposed below the first chamber, the second chamber comprising a second opening through which water exits the device;
a second impeller disposed in the second chamber, the second impeller being coupled to the first impeller; and
a fluid inlet in communication with the second chamber;
wherein the device is constructed such that water flows through the fluid inlet into the second chamber, through the second chamber causing rotation of the first impeller and the second impeller, and out the second opening, exiting the device;
wherein rotation of the first impeller causes the product to dispense from the first opening, exiting the device separate from the water; and
wherein the product and water begin mixing at a distance at least four feet from the second opening.

* * * * *